US012589420B2

(12) United States Patent
Deng et al.

(10) Patent No.: US 12,589,420 B2
(45) Date of Patent: Mar. 31, 2026

(54) IMPURITY REMOVAL METHOD OF SILICATE SOLID WASTE AND ITS APPLICATION

(71) Applicant: WUHAN UNIVERSITY OF TECHNOLOGY, Wuhan (CN)

(72) Inventors: Tengfei Deng, Wuhan (CN); Caisheng Guo, Wuhan (CN); Wei Chen, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 683 days.

(21) Appl. No.: 18/008,557

(22) PCT Filed: May 9, 2022

(86) PCT No.: PCT/CN2022/091589
§ 371 (c)(1),
(2) Date: Apr. 9, 2023

(87) PCT Pub. No.: WO2022/237705
PCT Pub. Date: Nov. 17, 2022

(65) Prior Publication Data
US 2023/0211392 A1 Jul. 6, 2023

(30) Foreign Application Priority Data

May 10, 2021 (CN) .......................... 202110506835.4

(51) Int. Cl.
| | |
|---|---|
| B09B 3/00 | (2022.01) |
| B09B 3/32 | (2022.01) |
| B09B 3/35 | (2022.01) |
| B09B 3/40 | (2022.01) |
| B09B 3/80 | (2022.01) |
| B09B 5/00 | (2006.01) |
| C04B 33/132 | (2006.01) |
| C04B 35/18 | (2006.01) |

(52) U.S. Cl.
CPC ................. B09B 3/40 (2022.01); B09B 3/32 (2022.01); B09B 3/35 (2022.01); B09B 3/80 (2022.01)

(58) Field of Classification Search
CPC .... B09B 3/32; B09B 3/35; B09B 3/40; B09B 3/80; B09B 3/00; B09B 5/00; C03B 5/005; C03B 5/021; C03C 1/002; C03C 1/02; C04B 33/132; C04B 35/18; C04B 35/62204; Y02P 10/20; Y02P 40/60

USPC .......................................................... 423/326
See application file for complete search history.

(56) References Cited

U.S. PATENT DOCUMENTS

| | | | |
|---|---|---|---|
| 3,556,774 A | 1/1971 | Brunner | |
| 2009/0255371 A1* | 10/2009 | Krause ................... | C01F 7/066 75/10.67 |

FOREIGN PATENT DOCUMENTS

| | | |
|---|---|---|
| CN | 103589867 A | 2/2014 |
| CN | 203679244 A | 7/2014 |
| CN | 107572532 A | 1/2018 |
| CN | 108993770 A | 12/2018 |
| CN | 110127643 A | 8/2019 |
| CN | 113245347 A | 8/2021 |

OTHER PUBLICATIONS

PCT Written Opinion for PCT International Patent Application No. PCT/CN2022/091589.
PCT Search Report for PCT International Patent Application No. PCT/CN2022/091589.

* cited by examiner

*Primary Examiner* — Cam N. Nguyen
(74) *Attorney, Agent, or Firm* — Olive Law Group, PLLC

(57) ABSTRACT

The present application discloses the impurity removal method of silicate solid waste and its application. This method includes: (A) Heat and melt the silicate solid waste to be treated to form the melt, and stratify the melt during the reduction reaction; (B) An upper melt component obtained by the stratification is subjected to magnetic phase-induced crystallization to obtain a ferromagnetic solid; (C) The ferromagnetic solid goes through magnetic separation, and what remains is the solid waste after impurity removal. This impurity removal method can effectively reduce the main impurity content of the solid waste including iron oxide. The removed solid waste can be directly used for the preparation of high value-added materials such as insulating ceramics and micro-crystal glass.

10 Claims, No Drawings

IMPURITY REMOVAL METHOD OF SILICATE SOLID WASTE AND ITS APPLICATION

CROSS REFERENCE TO RELATED APPLICATIONS

This is a U.S. national stage patent application that claims priority to and the benefit of PCT International Patent Application No. PCT/CN2022/091589, filed on May 9, 2022, which claims priority to and the benefit of Chinese Patent Application No. 202110506835.4, filed on May 10, 2021; the disclosures of which are incorporated by reference herein in their entireties.

TECHNICAL FIELD

The present invention relates to the technical field of solid waste removal, in particular to silicate solid waste removal method and its application.

BACKGROUND TECHNOLOGY

Silicate solid waste such as coal gangue, red mud, coal ash, steel slag and tailing is massive and difficult to deal with. Generally, the solid waste is stored by means of landfill and storage yard, which not only occupies land resources, but also causes great pollution to the environment. The storage yard is prone to dam collapse and collapse accidents, which also poses a threat to the safety of people's lives and property. The main substances in these solid waste are $Al_2O_3$, $SiO_2$, CaO, MgO, etc., which are the main raw materials for the production of high value-added materials such as ceramics, micro-crystal glass and cement. Therefore, it is necessary to deal with these solid wastes and turn them into treasure. But these solid wastes mostly contain $Fe_2O_3$, $Na_2O$, $K_2O$, $P_2O_5$ and some heavy metal elements. If not separated, the existence of these impurity elements will greatly affect the capability of the materials prepared by solid waste as raw materials, thus affecting the utilization and transformation of these solid wastes. Researchers have tried several ways to separate impurities from solid waste.

Chinese invention patent CN112570127A has released a production line to remove the ferrum of vanadium slag. The recovery of vanadium pent-oxide and the removal of the magnetic ferrum from the vanadium slag are realized by the crushing device, the dust collecting device, and the magnetic separation device. Chinese invention patent CN104404260A discloses a method of separating valuable metal from steel slag. The steel slag is mixed with binder, additives, reducing agent and goes through reduction roasting, in order to obtain the flue gas containing zinc oxide and lead oxide and the mixture of tail slag and ferrum powder, and the ferrum powder and tail slag are separated through magnetic separation. Chinese invention patent CN107447113A discloses a method for separating ferrum and aluminum from red mud and/or ferrum-containing solid waste. The red mud and/or ferrum-containing solid waste are acid-soaked and reduced to obtain the residue and the reductant liquid. The pH of the reductant liquid is successively adjusted as the precipitation pH interval of trivalent aluminum ions and divalent ferrum ions to separate the aluminum and ferrum. In the above existing technologies, carbon mixed solid waste roasting combined with magnetic separation is used to separate the ferrum oxide and other impurities in the solid waste. This process usually needs to include crushing the solid waste to powder and mixing the powder for a long time roasting (up to 2-20 h) to achieve the removal of impurities in solid waste. This process requires a long roasting time, and the reduced main impurity elements are easy to be reoxidized in the air atmosphere. The failure to fully mix carbon powder and solid waste will also lead to some oxides that cannot be reduced, resulting in the overtop content of the main impurities of solid waste after impurity removal.

Technical Solutions

In view of the existing technology, the present application provides the impurity removal method of silicate solid waste and its application, which can effectively reduce the main impurity content of solid waste after impurity removal.

According to the general cognition of those skilled in this field, the impurities in silicate solid waste are mainly $Fe_2O_3$, $Na_2O$, $K_2O$, $P_2O_5$, or other metal oxides, and the removal of iron oxide impurities is the biggest bottleneck of the impurity removal. To better remove these iron oxide main impurities, attempts are usually made to improve the conversion rate of the reduction reaction. For example, increasing the contact area of materials in the reduction reaction, specifically, the reducing agent and the solid waste to be treated are fully crushed and then dispersed to obtain the mixture, which is roasted and a reduction reaction occurs. However, it is still difficult to fundamentally prevent the iron particles after the reduced reaction from being re-oxidized through a long stay in the system, thus resulting in the limited removal effect of oxide impurities in the final solid waste.

The present invention abandoned the idea of impurity removal method in the existing technology, then it was unexpectedly found that when the reduction reaction of silicate solid waste is under the temperature of molten state, part of the main impurities will be evaporated, and unevaporated impurity parts will be physically stratified to form the upper components and the lower components, and the lower components are mainly iron reduced by iron oxide and can be easily separated. More importantly, because the lower iron are isolated from the upper component, the possibility of being oxidized again is reduced, and because the lower component can be more easily separated, it also avoids the possibility of prolonged stay in the system. Then, the iron oxide residual in the upper component is completely removed by magnetic phase-induced crystal separation and magnetic separation, thus improving the removal of the main impurities. Based on this, the present application is created.

In the first aspect, the present application provides a impurity removal method for silicate solid waste, which is prepared by the following steps:

(A) Heat and melt the silicate solid waste to form the melt, and stratify the melt during the reduction reaction;

(B) An upper melt component obtained by the stratification is subjected to magnetic phase-induced crystallization to obtain a ferromagnetic phase solid;

(C) The ferromagnetic phase solid is magnetically separated, and the remaining phase is the solid waste after impurity removal.

Silicate Solid Waste

Silicate solid waste in this application refers to solid waste containing silicate components (herein, the silicate components are aluminum silicate, magnesium silicate, etc.), which contains but is not limited to aluminum silicate, such as coal gangue, red mud, fly ash, steel slag, tailings, etc.

Reduction Reaction

The form of the reduction reaction in this application may adopt any existing technology, such as in-letting a reducing atmosphere, such as hydrogen, carbon monoxide, etc., or using a solid-phase reducing agent.

As a preferred implementation, the reducing agent in this application may be graphite (in the form of a container), where the melt is placed in a graphite material container, such as a graphite crucible, etc. Special attention should be paid that because the melt in the graphite container is liquid, it has reliable contact with the graphite itself, which can ensure that the graphite serve well as the reducing agent. What's more, the graphite in the graphite material container can also consume the oxygen in the reaction system, thus offering the reaction system an anaerobic environment, and the carbon monoxide produced by the consumption of oxygen can also serve as a reducing agent to for the melt.

Due to the high density of iron monomer after the reduction reaction, it can form the lower component in the whole melt reaction system, and the lower component can be easily separated from the melt system, so that the iron monomer will not stay in the system, thus decreasing the possibility of oxidation.

It should be added that the aforementioned graphite material container can also facilitate the transfer of the lower and the upper components formed by the melt.

Typically, taking the thoroughness of the reduction into consideration, we set the time of the reduction reaction to 2~5 min, such as 2 min, 2.5 min, 3 min, 4 min, 4.5 min, 5 min, etc.

Heating & Melting

In the present invention of this application, some of the impurity components with low boiling point will be evaporated through heating and melting. For better volatilizing effect, the heating and melting temperature can be 1400~1600° C., such as 1400° C., 1410° C., 1450° C., 1480° C., 1500° C., 1520° C., 1550° C., 1580° C., 1500° C., etc. As for the method, gradient heating may be adopted, for example heating up to the predetermined temperature in 5-10 min.

The equipment for heating and melting is an electromagnetic induction heating furnace, considering its high heating speed.

In the present invention of this application, the electromagnetic induction heating furnace is provided with a graphite lining for accommodating solid silicate waste to be treated. Graphite lining can generate a vortex in the magnetic field and quickly heat the container. Meanwhile, serving as the container, it can react with the oxygen in the air to generate carbon monoxide and release heat, so that the overall heating efficiency will be higher. Carbon monoxide gas can also act as a reducing agent to return the valuable metals in inorganic solid waste.

Magnetic Phase-Induced Crystallization

Magnetic Phase-induced Crystallization refers to the ferromagnetic phase (namely iron oxide) in the melt being preferentially precipitated during annealing under the action of magnetic field. The solid phase formed by magnetic phase induced segregation contains nonferromagnetic phase components and ferromagnetic phase components. As for the ferromagnetic phase components, they can be removed by a subsequent magnetic separation, thus achieving the ideal purpose.

Typically, the temperature of the magnetic phase-induced crystallization is 850~950° C., such as 850° C., 860° C., 880° C., 900° C., 920° C., 940° C., 950° C., etc. The magnetic field strength of the magnetic phase-induced crystallization is 0.1~10 T, e. g., 0.1 T, 0.5 T, 1 T, 2 T, 4 T, 5 T, 8 T, 9 T, 10 T, etc.

It is known to those skilled in this field that a magnetic phase-induced crystallization includes cooling down during the annealing process. Preferably, the temperature of cooling down ranges from 0.5 to 1° C., e.g., 0.5° C./min, 0.55° C./min, 0.6° C./min, 0.7° C./min, 0.8° C./min, 0.9° C./min, 1° C./min, etc.

Magnetic Separation

Magnetic separation refers to the process in which the ferromagnetic phase component is separated from the solid containing ferromagnetic phase component by a magnetic field separation. For reference, the particle size of the magnetic separation powder is less than 100 μm. The strength of the magnetic field is 70-100 KA/m.

Pre-Processing

In the present application, before step (A), the silicate solid waste shall be crushed until the particle size shall not exceed 200 μm, and the crushed solid waste shall be pressed into blocks.

Blocks can avoid the risk of the powder "bumping" due to the rapid expansion of the gas caused by the heating of the electromagnetic induction heating furnace.

Secondly, the solid waste after the impurity removal method in this application can serve as a raw material for silicate products.

In this application, the solid waste after the impurity removal method contains little iron and much silicate, so it is suitable to serve as a raw material for silicate products. What is known to those skilled in this field is that silicate products include but are not limited to glass, ceramics, etc.

Specific Implementation Method

In order to clarify the purpose, technical scheme and advantages of the present invention, it is further described in detail in combination with following exploit examples. It should be understood that the exploit examples described herein are used only to interpret the present invention, instead of defining it.

EXAMPLE 1

(Coal Gangue as the Silicate Solid Waste)

The main components of the coal gangue to be treated are shown in Table 1 below:

TABLE 1

| | SiO$_2$ | Al$_2$O$_3$ | CaO | MgO | TFe$_2$O$_3$ | MnO | Na$_2$O | P$_2$O$_5$ | Total |
|---|---|---|---|---|---|---|---|---|---|
| coal gangue | 54.18 | 29.07 | 2.29 | 1.40 | 12.50 | 0.18 | 0.07 | 0.31 | 100 |

Step 1: The coal gangue of the above components was broken up and ball-milled for 2 h with a grinding speed of 500 r/min. The powder left was pressed into wafer with a pressure of 15 Mpa and a pressure retention time of 1 min, with a diameter of 20 mm and a thickness of 10 mm.

Step 2: The nubbly raw material was put into a graphite crucible with an internal diameter of 34 mm and an outer diameter of 46 mm. Afterwards, the graphite crucible was put into a fire-resistant sleeve, and both of them were put together into the electromagnetic induction coil, with a diameter of 10 mm and cooling water inside. After the cooling water was in, the electromagnetic induction heating furnace was started.

Step 3: The temperature in the above furnace was controlled at 900° C., and the magnetic field strength was 5 T. The upper melt was transferred to the furnace with a controlled cooling rate of 0.5° C./min until the melt was cooled down to room temperature.

Step 4: After the cooled melt was crushed, the particle size should be lower than 75 μm, and go through the magnetic separator with a magnetic field strength of 80 KA/m to complete the magnetic separation. Afterwards, the composition of the solid after impurity removal was analyzed, and the results are shown in Table 2:

TABLE 2

| | | | Composition after impurity removal (wt %) | | | | | |
|---|---|---|---|---|---|---|---|---|
| | $SiO_2$ | $Al_2O_3$ | CaO | MgO | $TFe_2O_3$ | MnO | $Na_2O$ | $P_2O_5$ | Total |
| solid after impurity removal | 53.83 | 42.04 | 1.76 | 1.70 | 0.32 | 0.15 | 0.20 | 0 | 100 |

EXAMPLE 2

(A Mixture of Coal Gangue, Fly Ash and Steel Slag as the Silicate Solid Waste)

Step 1: Crush and mix the coal gangue (23.5%), fly ash (36.5%) and steel slag (40%). The mixture was ball-milled for 2 h with a grinding speed of 500 r/min. The powder left was pressed into wafer with a pressure of 15 Mpa and a pressure retention time of 1 min, with a diameter of 20 mm and a thickness of 10 mm. The composition of coal gangue, fly ash, steel slag and the mixture are shown in Table 3.

TABLE 3

| | | Composition of coal gangue, fly ash, steel slag and the mixture (wt %) | | | | | | |
|---|---|---|---|---|---|---|---|---|
| | $SiO_2$ | $Al_2O_3$ | CaO | MgO | $TFe_2O_3$ | MnO | $P_2O_5$ | $Na_2O$ | Total |
| fly ash | 58.17 | 37.50 | 0.23 | 0.30 | 3.52 | 0.10 | 0.10 | 0.08 | 100 |
| coal gangue | 52.99 | 41.43 | 1.82 | 0.44 | 3.04 | 0.01 | 0.18 | 0.09 | 100 |
| steel slag | 15.47 | 2.62 | 43.25 | 6.80 | 26.60 | 3.09 | 2.17 | / | 100 |
| mixture | 39.20 | 24.98 | 18.02 | 2.95 | 12.58 | 1.26 | 0.96 | 0.05 | 100 |

Step 2: The nubbly raw material was put into a graphite crucible with an internal diameter of 34 mm and an outer diameter of 46 mm. Afterwards, the graphite crucible was put into a fire-resistant sleeve, and both of them were put together into the electromagnetic induction coil, with a diameter of 10 mm and cooling water inside. After the cooling water was in, the electromagnetic induction heating furnace was started, and the frequency was set to 40 KHZ. The current was 30 A in 1~5 min and then changed to 35 A in 5~10 min. The reactant started to melt at 10 min, and the temperature was about 1500° C. The upper melt was removed after 15 min of the reaction.

Step 3: The temperature in the above furnace was controlled at 900° C., and the magnetic field strength was 5 T. The upper melt was transferred to the furnace with a controlled cooling rate of 0.5° C./min until the melt was cooled down to room temperature.

Step 4: After the cooled melt was crushed, the particle size should be lower than 75 μm, and go through the magnetic separator with a magnetic field strength of 80 KA/m to complete the magnetic separation. Afterwards, the composition of the solid after impurity removal was analyzed, and the results are shown in Table 4:

TABLE 4

| | Composition after impurity removal (wt %) | | | | | | | | |
|---|---|---|---|---|---|---|---|---|---|
| | $SiO_2$ | $Al_2O_3$ | CaO | MgO | $TFe_2O_3$ | MnO | $P_2O_5$ | $Na_2O$ | Total |
| solid after impurity removal | 40.83 | 31.41 | 22.74 | 3.11 | 0.49 | 1.31 | 0.02 | 0.09 | 100 |

After two times of impurity removal, the iron content in the solid waste was reduced from 12.58% to 0.49%, and the recovery rate reached 96.10%. At the same time, the $P_2O_5$ content in the solid waste was reduced from 0.96% to 0.02%.

The above are only preferred exploit examples of the present invention. The scope of protection of this invention is not limited thereto. Within the technical scope as disclosed by the present invention, the changes or replacement that are easily conceivable for anyone familiar with this field should be covered by the protection scope of the invention.

What is claimed is:

1. A method for removing impurity from a silicate solid waste, comprising the following steps:

(A) heating and melting a silicate solid waste to form a melt, and stratifying the melt during the reduction reaction;

(B) subjecting the upper melt component obtained from the stratifying to magnetic phase-induced crystallization to obtain a ferromagnetic phase solid; and (C) separating the ferromagnetic phase solid magnetically, and the remaining phase is the solid waste after impurity removal.

2. The method according to claim 1, wherein the temperature of the heating and melting ranges from 1400 to 1600° C.

3. The method according to claim 1, wherein a container is used for the silicate solid waste to be treated which is made of graphite.

4. The method according to claim 1, wherein an equipment is used for the heating and melting which is an electromagnetic induction heating furnace.

5. The impurity removal method according to claim 4, wherein the electromagnetic induction heating furnace is provided with a graphite lining for accommodating solid silicate waste to be treated.

6. The impurity removal method according to claim 1, wherein the reduction reaction time ranged from 2 to 5 min.

7. The impurity removal method according to claim 1, wherein the temperature of the magnetic phase-induced crystallization is 850 to 950° C., and the magnetic field strength is 0.1 to 10 T.

8. The impurity removal method according to claim 1, wherein the cooling rate of the magnetic phase-induce temperature is 0.5 to 1° C./min.

9. The impurity removal method according to claim 1, wherein before step (A), the silicate solid waste is crushed until a particle size does not exceed 200 μm, and the silicate solid waste crushed is pressed into blocks.

10. The impurity removal method according to claim 1, wherein the solid waste obtained from the impurity removal method can be used a raw material for silicate products.

* * * * *